United States Patent
Gouko et al.

(10) Patent No.: US 10,464,113 B2
(45) Date of Patent: Nov. 5, 2019

(54) MONITORING DEVICE

(71) Applicant: DENSO CORPORATION, Kariya, Aichi-pref. (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP); Masahiro Asano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 386 days.

(21) Appl. No.: 15/480,440

(22) Filed: Apr. 6, 2017

(65) Prior Publication Data
US 2017/0291204 A1    Oct. 12, 2017

(30) Foreign Application Priority Data
Apr. 8, 2016 (JP) .................................. 2016-078340

(51) Int. Cl.
| G01N 25/00 | (2006.01) |
| G01K 1/00 | (2006.01) |
| G01K 13/00 | (2006.01) |
| B21B 38/00 | (2006.01) |
| G01K 17/00 | (2006.01) |
| B21C 51/00 | (2006.01) |
| B21D 5/08 | (2006.01) |
| G01K 13/08 | (2006.01) |
| G01K 17/20 | (2006.01) |

(52) U.S. Cl.
CPC ............ *B21B 38/006* (2013.01); *B21C 51/00* (2013.01); *B21D 5/08* (2013.01); *G01K 13/08* (2013.01); *G01K 17/00* (2013.01); *G01K 17/20* (2013.01); *B21B 2038/002* (2013.01)

(58) Field of Classification Search
USPC .......................................... 374/141, 45, 153
See application file for complete search history.

(56) References Cited

U.S. PATENT DOCUMENTS
| 2015/0144171 A1 | 5/2015 | Taniguchi et al. |
| 2018/0038678 A1* | 2/2018 | Gouko ................. F01D 17/085 |

FOREIGN PATENT DOCUMENTS
JP    2017187450 A    10/2017

* cited by examiner

*Primary Examiner* — Mirellys Jagan
(74) *Attorney, Agent, or Firm* — Harness, Dickey & Pierce, P.L.C.

(57) ABSTRACT

A monitoring device monitors a forming machine (target device). The forming machine includes a housing, a bearing attached to the housing, and a shaft placed radially inside the bearing. The monitoring device includes a plurality of heat flux sensors and a detector. The heat flux sensors are provided on the radially outer side of the bearing and spaced from each other in the circumferential direction of the bearing. The heat flux sensors output a signal corresponding to heat fluxes through faces thereof on the bearing side and faces thereof on the other side. The detector detects a load applied radially to the shaft or bearing, based on the output from the heat flux sensors.

11 Claims, 10 Drawing Sheets

MONITORING DEVICE

CROSS-REFERENCE TO RELATED APPLICATION

This application is based on and claims the benefit of priority from earlier Japanese Patent Application No. 2016-78340 filed Apr. 8, 2016, the description of which is incorporated herein by reference.

BACKGROUND OF THE INVENTION

Technical Field of the Invention

The present disclosure concerns a technique for monitoring a load applied to a shaft or bearing in a target device.

Description of the Related Art

For example, JP 5376086 B discloses a heat flux sensor for detecting heat flux.

A forming machine as follows is known. The forming machine passes a strip material serving as a processing target between two forming rollers. The forming machine applies loads to the processing target with the two forming rollers to process the processing target continuously. Such forming machine is desired to meet the following requirements in order to form the processing target into a desired shape. Specifically, the requirements are that the loads applied to the processing target by the forming rollers are kept constant and the gap between the two forming rollers is also kept constant.

In general, a forming machine determines whether a product is defective or not by inspecting the appearance of the finished product that has been subjected to forming. However, the appearance inspection may increase the workload for inspection and reduce the rate of operation due to stopping of the forming machine when a defective product has been found.

In view of the above, a monitoring device that can monitor the loads applied to the shafts connected to the forming rollers or the loads applied to the bearings rotatably supporting the shafts while the forming machine is operating is desirable. However, the following problems must be overcome to realize such monitoring device.

Load cells may be attached to the radially outer sides of the shafts or bearings to realize such monitoring device. However, attaching load cells to the shafts is difficult in terms of wiring since they rotate when the forming machine is in operation. The bearings experience changes in the gaps between the inner ring, outer ring, and rolling elements composing the bearings, or deformation in the rolling elements. Thus, even if load cells are attached to the bearings, detecting the loads applied to the shafts or bearings is difficult.

The above-described problems concerning monitoring devices are not limited to arise in forming machines but equally apply to various devices (devices to be monitored) including a shaft and bearing.

SUMMARY OF THE INVENTION

An object of the present disclosure is to provide a technique for monitoring a load applied to a shaft or bearing in a target device.

A monitoring device according to an aspect of the technique disclosed herein monitors a target device (50). The target device includes a housing (51), a bearing (61 to 64) attached to the housing, and a shaft (52, 53) placed radially inside the bearing such that it can rotate with respect to the housing.

The monitoring device includes a plurality of heat flux sensors (10 to 14) and a detector (20). The heat flux sensors are provided on the radially outer side of the bearing and spaced from each other in the circumferential direction of the bearing. The heat flux sensors output a signal corresponding to heat fluxes through faces thereof on the bearing side and faces thereof on the other side.

The detector detects a load applied radially to the shaft or bearing, based on the output from the heat flux sensors.

In the monitored device, when the shaft rotates, the frictional heat of an inner ring, an outer ring, and rolling elements in the bearing heats the entire periphery of the bearing. As a result, heat flows from the entire periphery of the bearing to the housing. This heat flux becomes temperature drifts in the outputs of the heat flux sensors. Additionally, in the monitored device, when a load is applied to the shaft in its radial direction while the shaft is rotating, the thermal dose increases at a part of the bearing in the direction in which the load is applied to the shaft. As a result, the amount of heat flowing from the part of the bearing to the housing increases. In the monitoring device, this heat flow causes the output of a part of the heat flux sensors to increase. Thus, the detector removes temperature drifts from the outputs of the heat flux sensors, based on an output corresponding to the difference between the thermal electromotive forces of the heat flux sensors positioned apart from each other in the circumferential direction of the bearing. This allows the detector to extract an output signal corresponding to the load applied to the shaft or bearing in a radial direction thereof. Accordingly, the monitoring device disclosed herein can monitor a load applied to the shaft or bearing in a radial direction thereof while the shaft of the target device is rotating.

The reference numbers of the elements in parentheses described in this section are merely examples for indicating their correspondence to the specific functions described in relation to the embodiments described below.

DETAILED DESCRIPTION OF THE PREFERRED EMBODIMENTS

Embodiments of a monitoring device according to one aspect of the disclosed technique will now be described with reference to the drawings. The same or equivalent parts in the embodiments described below are assigned with the same number.

First Embodiment

Figure 1:
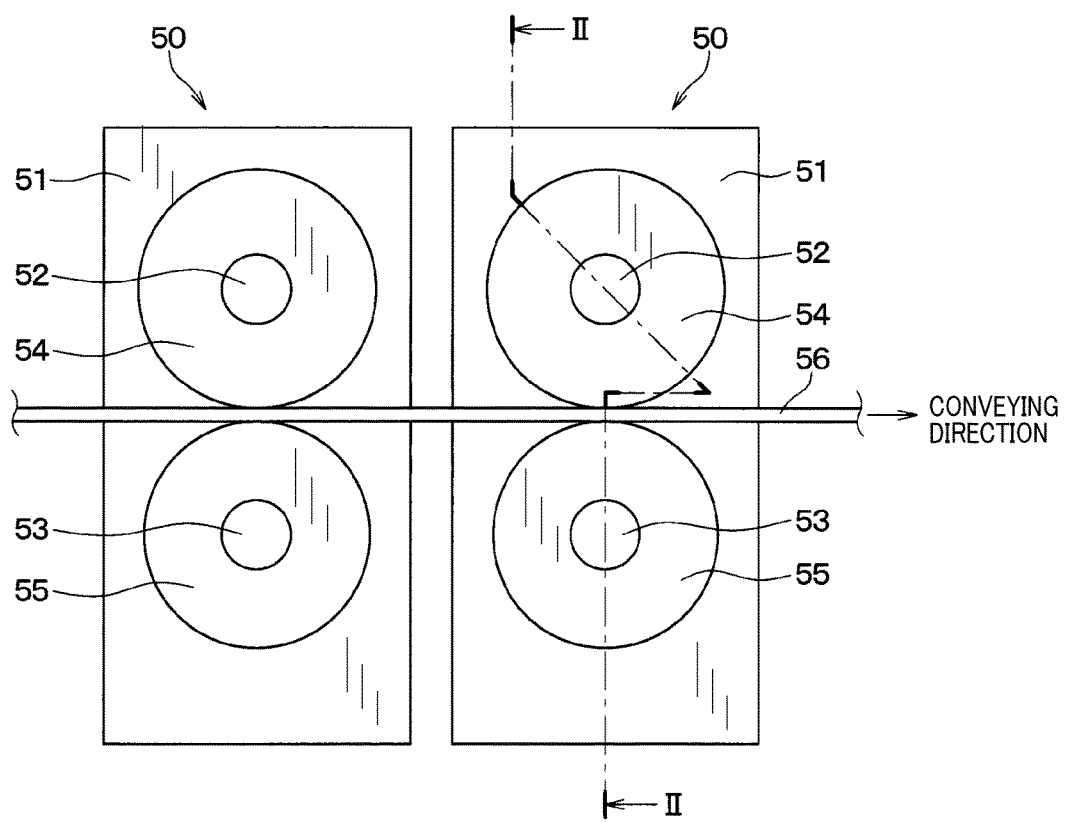
FIG. 1 is a schematic drawing of a target device to which a monitoring device according to a first embodiment is attached.
Figure 2:
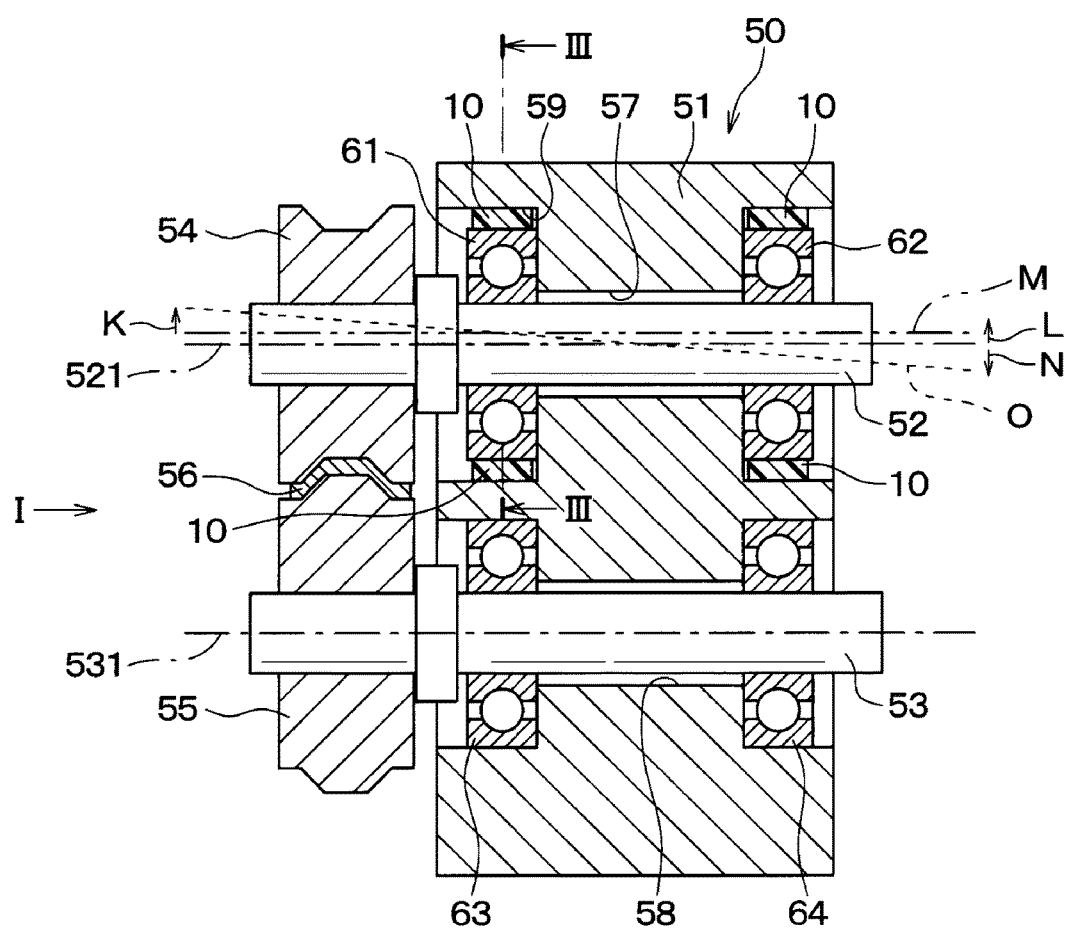
FIG. 2 is a cross-sectional view taken along line II-II shown in FIG. 1.
Figure 3:
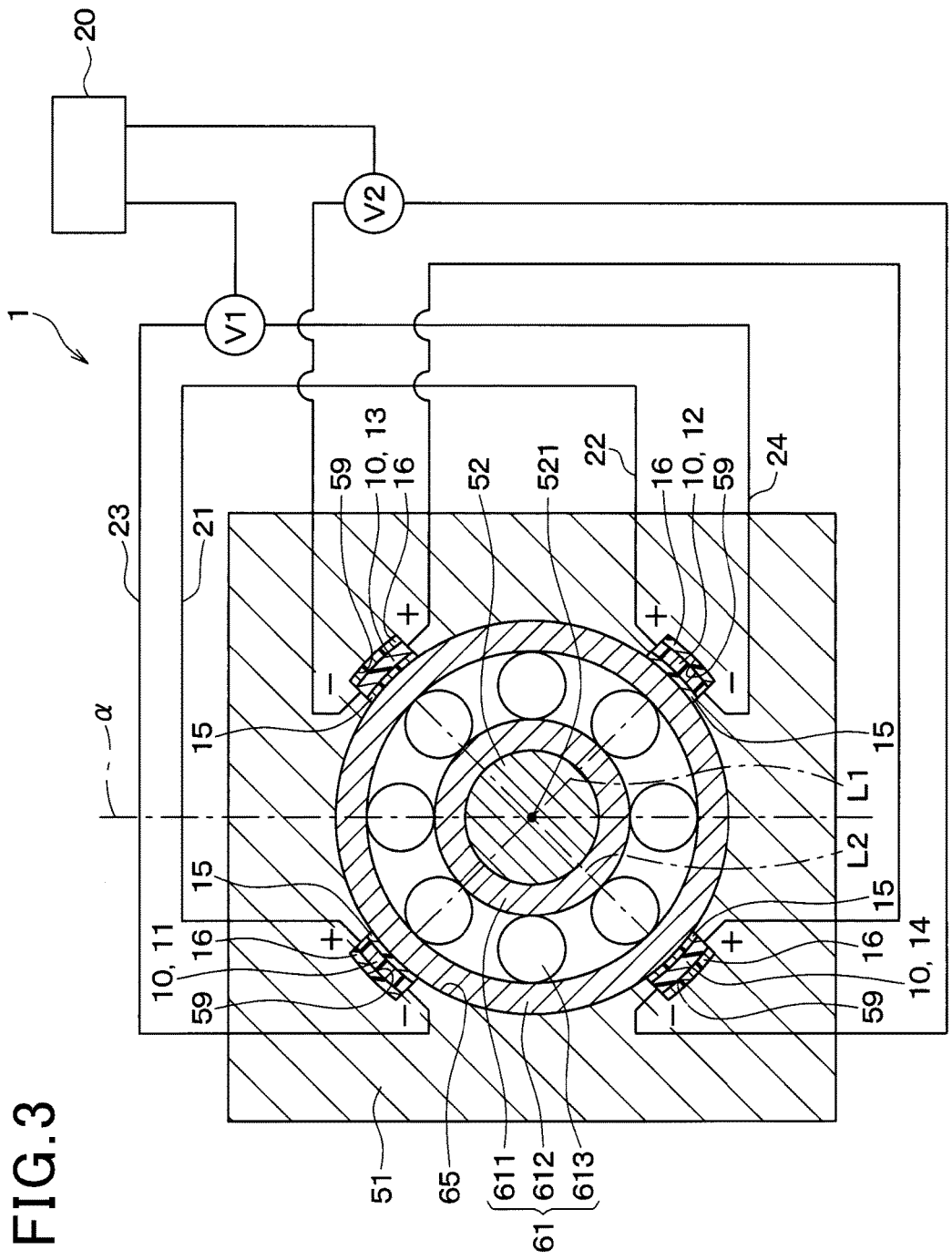
FIG. 3 is a cross-sectional view taken along line III-III shown in FIG. 2.

A first embodiment of a monitoring device will be described. As shown in FIGS. 1 to 3, a monitoring device 1 of this embodiment is attached to a forming machine 50 which is the device to be monitored. The monitoring device 1 monitors a load applied to a shaft or bearing in the forming machine 50.

First, the forming machine 50 will be described.

As shown in FIGS. 1 and 2, the forming machine 50 includes a housing 51, two shafts 52, 53, and two forming rollers 54, 55. The two shafts 52, 53 are provided in the housing 51 such that they can rotate about their axes. Each forming roller 54, 55 is fixed to the corresponding shaft 52, 53 at an end thereof. The shaft 52 and forming roller 54 in FIG. 1 will be hereinafter referred to as a first shaft 52 and first forming roller 54. Additionally, the shaft 53 and forming roller 55 in FIG. 1 will be referred to as a second shaft 53 and second forming roller 55.

The forming machine 50 passes a strip material serving as a processing target 56 between the first forming roller 54 and second forming roller 55. The forming machine 50 applies loads to the processing target 56 with the first forming roller 54 and second forming roller 55 to process the processing target 56. It is to be noted that, in the step of forming, the shape of the processing target 56 may be gradually changed by placing a plurality of forming machines 50 in the conveying direction of the processing target 56.

As shown in FIG. 2, the first shaft 52 is inserted through a hole 57 provided in the housing 51. The first shaft 52 is supported by two bearings 61, 62 positioned apart from each other along the first shaft 52, such that the first shaft 52 can rotate with respect to the housing 51. The bearing positioned closer to the first forming roller 54 will be hereinafter referred to as a first bearing 61. The bearing positioned further from the first forming roller 54 than the first bearing 61 will be hereinafter referred to as a second bearing 62.

The second shaft 53 is inserted through a hole 58 provided in the housing 51. The second shaft 53 is supported by two bearings 63, 64 positioned apart from each other along the second shaft 53, such that the second shaft 53 can rotate with respect to the housing 51. The bearing positioned closer to the second forming roller 55 will be hereinafter referred to as a third bearing 63. The bearing positioned further from the second forming roller 55 than the third bearing 63 will be hereinafter referred to as a fourth bearing 64.

FIG. 3 shows parts of the first shaft 52, first bearing 61, and housing 51.

The first bearing 61 includes an inner ring 611, outer ring 612, and a plurality of rolling elements 613. The inner ring 611 has a cylindrical shape. The inner ring 611 engages with the radially outer wall of the first shaft 52. The outer ring 612 has a cylindrical shape. The outer ring 612 engages with a bearing hole 65 provided in the housing 51. The plurality of rolling elements 613 each have a spherical shape. The rolling elements 613 are placed between the inner ring 611 and outer ring 612 such that they can both roll and revolve. The circumferential intervals between the plurality of rolling elements 613 are maintained by a holder (not shown).

The configurations of the first bearing 61, second bearing 62, third bearing 63, and fourth bearing 64 are identical.

The monitoring device 1 which monitors the forming machine 50 will now be described.

As shown in FIGS. 2 and 3, the monitoring device 1 includes a plurality of heat flux sensors 10, and a detector 20.

Four heat flux sensors 10 are provided on the radially outer side of the first bearing 61. Similarly, four heat flux sensors are provided on the radially outer side of the second bearing 62. The four heat flux sensors placed around the first bearing 61 will be hereinafter referred to as heat flux sensors for the first bearing. The four heat flux sensors placed around the second bearing 62 will be hereinafter referred to as heat flux sensors for the second bearing. The four heat flux sensors for the first bearing and the four heat flux sensors for the second bearing all have the same configuration.

Figure 4:
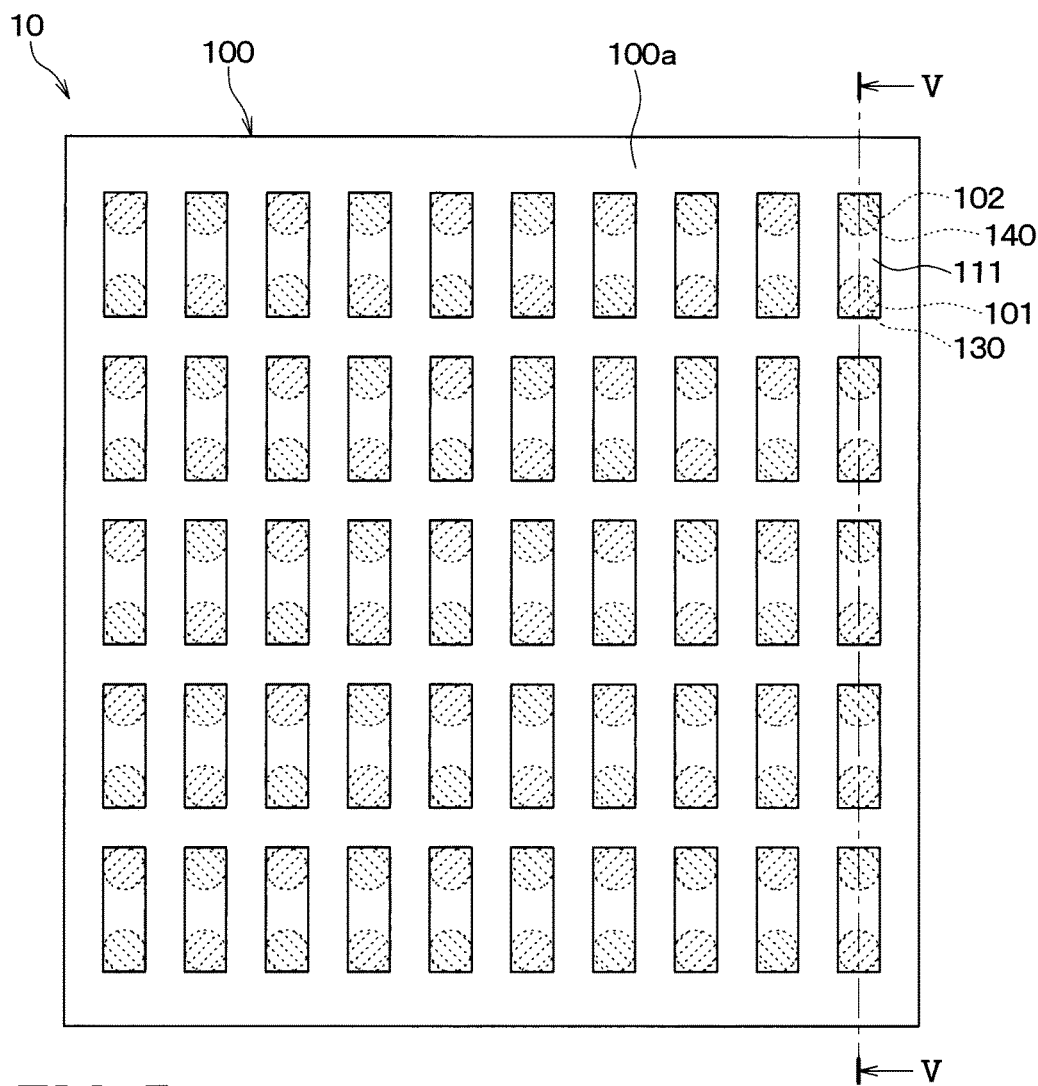
FIG. 4 is a plane view of a heat flux sensor shown in FIG. 3.
Figure 5:
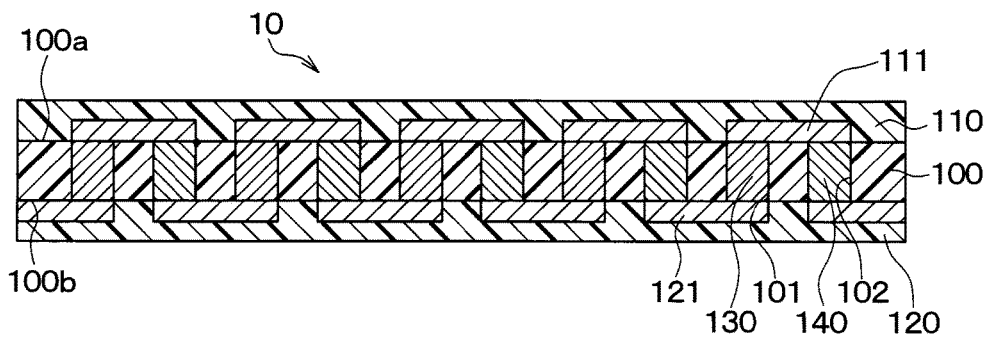
FIG. 5 is a cross-sectional view taken along line V-V shown in FIG. 4.

As shown in FIGS. 4 and 5, the heat flux sensor 10 is an integrated component including an insulating substrate 100, a front side protector 110, and a back side protector 120. The heat flux sensor 10 also includes first and second interlayer connectors 130, 140 connected in series alternately inside the integrated component. The front side protector 110 is omitted in FIG. 4. The insulating substrate 100, front side protector 110, and back side protector 120 are in the form of films. The insulating substrate 100, front side protector 110, and back side protector 120 are made of a flexible resin material such as thermoplastic resin. The insulating substrate 100 includes first and second via holes 101, 102 (a plurality of via holes) which penetrate it in its thickness direction. First and second interlayer connectors 130, 140 made of different thermoelectric materials such as metal or semiconductors are embedded within the first and second via holes 101, 102. One of the connecting parts of the first and second interlayer connectors 130, 140 is formed by a front side conductor pattern 111 provided on a front side 100a of the insulating substrate 100. The other of the connecting parts of the first and second interlayer connectors 130, 140 is formed by a back side conductor pattern 121 provided on a back side 100b of the insulating substrate 100.

Heat flows through the heat flux sensors 10 in the respective thickness directions of the heat flux sensors 10. As a result, a temperature difference occurs between the connecting parts of the first and second interlayer connectors 130, 140. The temperature difference induces a thermal electromotive force in the first and second interlayer connectors 130, 140 by the Seebeck effect. The heat flux sensors 10 output the thermal electromotive forces as their sensor signals (for example, voltage signals).

FIG. 3 shows four heat flux sensors for the first bearing. The four heat flux sensors for the first bearing are provided on the radially outer side of the first bearing 61 and spaced from each other in the circumferential direction of the first bearing 61.

One of two heat flux sensors symmetrically placed on the radially outer side of the first bearing 61 with respect to a centerline 521 of the first shaft 52 will be hereinafter referred to as a first heat flux sensor 11. The other of the two heat flux sensors will be referred to as a second heat flux sensor 12. One of the two remaining heat flux sensors symmetrically placed with respect to the centerline 521 of the first shaft 52 and spaced from the first and second heat flux sensors 11, 12 in the circumferential direction of the first bearing 61 will be hereinafter referred to as a third heat flux sensor 13. The other of the two heat flux sensors will be referred to as a fourth heat flux sensor 14.

The first to fourth heat flux sensors 11 to 14 are positioned such that a line L1 connecting the first heat flux sensor 11 and second heat flux sensor 12 and a line L2 connecting the third heat flux sensor 13 and fourth heat flux sensor 14 cross at right angles. The first to fourth heat flux sensors 11 to 14 may be positioned such that the two lines L1 and L2 intersect at a certain angle.

The first to fourth heat flux sensors 11 to 14 are arranged at positions that are not on a plane α including the centerline 521 of the first shaft 52 and the centerline 531 of the second shaft 53 (see FIG. 2). The first and fourth heat flux sensors 11, 14 and the second and third heat flux sensors 12, 13 are arranged at positions symmetric to each other with respect to the plane α.

As described earlier, the first to fourth heat flux sensors 11 to 14 are in the form of films, and the insulating substrates 100, front side protectors 110, and back side protectors 120 composing them are flexible. Thus, the first to fourth heat flux sensors 11 to 14 have curved shapes that conform to the radially outer wall of the first bearing 61.

The first to fourth heat flux sensors 11 to 14 are placed in recesses 59 extending radially outward from the inner wall of the bearing hole 65 of the housing 51. Thermal conductive sheets 15 are placed between the outer wall of the first bearing 61 and the first to fourth heat flux sensors 11 to 14 as thermal conductive members. Additionally, thermal conductive sheets 16 are placed between the inner walls of the recesses 59 in the housing 51 and the first to fourth heat flux sensors 11 to 14 as thermal conductive members.

Accordingly, this embodiment prevents gaps being formed between the outer wall of the first bearing 61, the first to fourth heat flux sensors 11 to 14, and the inner walls of the recesses 59 in the housing 51. As a result, heat flows well through the first bearing 61, thermal conductive sheets 15, first to fourth heat flux sensors 11 to 14, thermal conductive sheets 16, and housing 51. At this time, the first to fourth heat flux sensors 11 to 14 output signals corresponding to the heat fluxes through their faces on the bearing side and their faces on the other side in their respective thickness directions.

Only one of the thermal conductive sheet 15 and the thermal conductive sheet 16 may be placed between the outer wall of the first bearing 61 and the heat flux sensor 11 to 14 or between the inner wall of the recess 59 in the housing 51 and the heat flux sensor 11 to 14. Additionally, the thermal conductive member may be a thermal conductive gel instead of a thermal conductive sheet 15, 16.

The signals outputted from the first to fourth heat flux sensors 11 to 14 are inputted into the detector 20. The detector 20 includes a microcomputer, and a memory device.

The detector 20 detects a voltage signal corresponding to the difference between the thermal electromotive force of the first heat flux sensor 11 and the thermal electromotive force of the second heat flux sensor 12. This voltage signal will be hereinafter referred to as a first signal V1. The detector 20 also detects a voltage signal corresponding to the difference between the thermal electromotive force of the third heat flux sensor 13 and the thermal electromotive force of the fourth heat flux sensor 14. This voltage signal will be hereinafter referred to as a second signal V2.

Specifically, a line 21 has a higher voltage at the first heat flux sensor 11 when heat flows from the first bearing 61 to the housing 51 through the first heat flux sensor 11. A line 22 has a higher voltage at the second heat flux sensor 12 when heat flows from the first bearing 61 to the housing 51 through the second heat flux sensor 12. The lines 21, 22 are connected to each other. Accordingly, when the first heat flux sensor 11 has a larger thermal electromotive force than the second heat flux sensor 12, a current corresponding to the difference between the thermal electromotive forces flows from the first heat flux sensor 11 to the second heat flux sensor 12 in the lines 21, 22, and vice versa. Further, a line 23 has a lower voltage at the first heat flux sensor 11 when heat flows from the first bearing 61 to the housing 51 through the first heat flux sensor 11. A line 24 has a lower voltage at the second heat flux sensor 12 when heat flows from the first bearing 61 to the housing 51 through the second heat flux sensor 12. The lines 23, 24 are connected to each other. When the first heat flux sensor 11 has a smaller thermal electromotive force than the second heat flux sensor 12, a current corresponding to the difference between the thermal electromotive forces flows from the first heat flux sensor 11 to the second heat flux sensor 12 in the lines 23, 24, and vice versa. Accordingly, in this embodiment, a sense resistor is connected to the lines 23, 24 to measure the voltage across the sense resistor. This allows the detector 20 to detect the first signal V1, that is, the voltage signal corresponding to the difference between the thermal electromotive force of the first heat flux sensor 11 and the thermal electromotive force of the second heat flux sensor 12.

In the forming machine 50, when the first shaft 52 rotates, the frictional heat of the inner ring 611, outer ring 612, and rolling elements 613 in the first bearing 61 heats the entire periphery of the bearing. As a result, heat flows from the entire periphery of the first bearing 61 to the housing 51. This heat flux becomes temperature drifts in the outputs of the first to fourth heat flux sensors 11 to 14. Additionally, in the forming machine 50, when a load is applied to the first shaft 52 in its radial direction while the first shaft 52 is rotating, the thermal dose at a part of the first bearing 61 in the direction in which the load is applied increases. As a result, the amount of heat flowing from the part of the first bearing 61 to the housing 51 increases. In the monitoring device 1, this heat flow causes the output of a part of the first to fourth heat flux sensors 11 to 14 to increase. Thus, the detector 20 removes the temperature drifts from the outputs of the first heat flux sensor 11 and second heat flux sensor 12, based on the output (first signal V1) corresponding to the difference between the thermal electromotive force of the first heat flux sensor 11 and the thermal electromotive force of the second heat flux sensor 12. This allows the detector 20 to extract an output signal corresponding to a load applied to the first shaft 52 or first bearing 61 in a direction parallel to the line L1 connecting the first heat flux sensor 11 and second heat flux sensor 12.

The lines of the third heat flux sensor 13 and fourth heat flux sensor 14 are connected in the same way as the lines 21 to 24 of the first heat flux sensor 11 and second heat flux sensor 12 described above. Thus, the detector 20 can detect the second signal V2, that is, a voltage signal corresponding to the difference between the thermal electromotive force of the third heat flux sensor 13 and the thermal electromotive force of the fourth heat flux sensor 14. Thus, the detector 20 removes temperature drifts from the outputs of the third heat flux sensor 13 and fourth heat flux sensor 14, based on the second signal V2. This allows the detector 20 to extract an output signal corresponding to a load applied to the first shaft 52 or first bearing 61 in a direction parallel to the line L2 connecting the third heat flux sensor 13 and fourth heat flux sensor 14.

Figure 6:
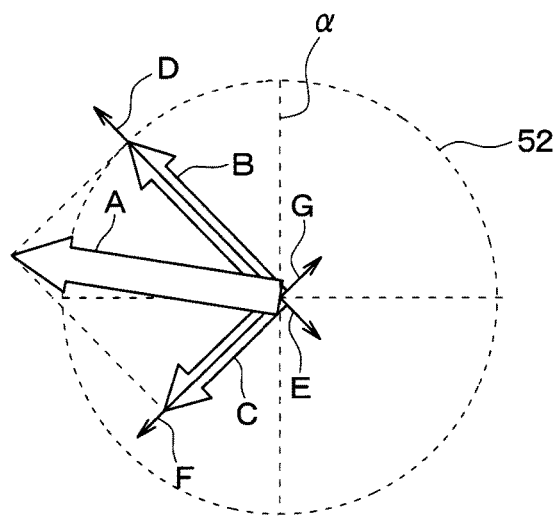
FIG. 6 is a diagram illustrating a method of detecting a load applied to a shaft in the first embodiment.

With reference to FIG. 6, a method of detecting a load applied to the shaft 52, performed by the detector 20, will now be described.

The circular dashed line in FIG. 6 conceptually illustrates the first shaft 52. The arrow A illustrates an example of a load applied to the first shaft 52 in its radial direction when the first shaft 52 is rotating about its axis. The arrows B, C illustrate two components into which the load illustrated by the arrow A has been resolved. The arrow B is directed in a direction parallel to the line L1 connecting the first heat flux sensor 11 and second heat flux sensor 12. The arrow C is directed in a direction parallel to the line L2 connecting the third heat flux sensor 13 and fourth heat flux sensor 14.

Additionally, in FIG. 6, the arrow D conceptually illustrates the thermal electromotive force of the first heat flux sensor 11, and the arrow E conceptually illustrates the thermal electromotive force of the second heat flux sensor 12. As described above, the first signal V1 is an output corresponding to the difference between the thermal electromotive force of the first heat flux sensor 11 and the thermal electromotive force of the second heat flux sensor 12. This first signal V1 corresponds to the component B of the load applied to the first shaft 52 in a radial direction thereof that is parallel to the line L1 connecting the first heat flux sensor 11 and second heat flux sensor 12.

Additionally, in FIG. 6, the arrow F conceptually illustrates the thermal electromotive force at the third heat flux sensor 13, and the arrow G conceptually illustrates the thermal electromotive force of the fourth heat flux sensor 14. As described above, the second signal V2 is an output corresponding to the difference between the thermal electromotive force of the third heat flux sensor 13 and the thermal electromotive force of the fourth heat flux sensor 14. This second signal V2 corresponds to the component C of the load applied to the first shaft 52 in a radial direction thereof that is parallel to the line L2 connecting the third heat flux sensor 13 and fourth heat flux sensor 14. Thus, the detector 20 can detect the direction and magnitude of the load A applied to the first shaft 52 or first bearing 61 by combining the two components B and C.

A method of detecting an abnormality, performed by the detector 20, will now be described.

Figure 7:
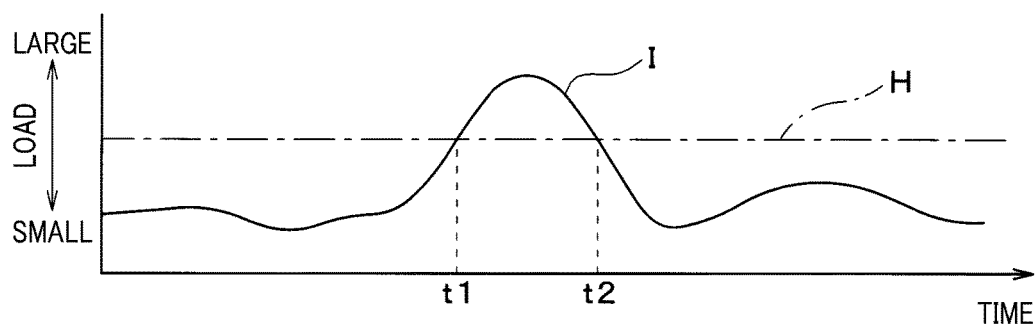
FIG. 7 shows an example of the change in the load applied to the shaft over time according to the first embodiment.

The horizontal axis in FIG. 7 shows the time that has elapsed since the forming machine 50 started operation. The vertical axis shows the load applied to the first shaft 52.

FIG. 7 shows an example of the change in the load applied to the first shaft 52 over time when the forming machine 50 is operating.

If the cross sections of the first and second forming rollers 54, 55 in the forming machine 50 have circumferentially the same shape, the load applied to the first shaft 52 is basically constant. However, the loads applied to the first and second shafts 52, 53 may change over time (e.g., from hours to years) due to, for example, temperature change in the environment where the forming machine 50 is placed, and wear or deterioration of the forming machine 50 over time. Further, the loads applied to the first shaft 52 and the second shaft 53 may change due to alteration of the thickness or material of the processing target 56.

As shown by the alternate long and short dashed line in FIG. 7, the detector 20 stores the value of tolerable load of the first shaft 52 as a certain threshold H. The threshold H is preset according to experiments or the like.

As shown by the solid line I in FIG. 7, the absolute value of the load applied to the first shaft 52 exceeds the threshold H between time t1 and time t2. In this case, the detector 20 detects application of abnormal loads to the first shaft 52 between time t1 and time t2.

A method of detecting an inclination or runout of the centerline of the shaft will now be described.

As shown in FIG. 2, the monitoring device 1 includes four heat flux sensors for the second bearing attached to the second bearing 62 in addition to the four heat flux sensors for the first bearing attached to the first bearing 61.

The heat flux sensors for the first bearing and the heat flux sensors for the second bearing have the same configuration. As with the heat flux sensors for the first bearing, signals outputted from the heat flux sensors for the second bearing are inputted into the detector 20.

The detector 20 can detect loads applied to the part of the first shaft 52 where the first bearing 61 is placed, based on the outputs from the four heat flux sensors for the first bearing. The detector 20 can also detect loads applied to the part of the first shaft 52 where the second bearing 62 is placed, based on the outputs from the four heat flux sensors for the second bearing.

The alternate long and short dashed line in FIG. 2 shows the centerline 521 of the first shaft 52 at a normal state. Here, the arrow K shows the direction of a load applied to the part of the first shaft 52 where the first bearing 61 is placed. The arrow L shows the direction of a load applied to the part of the first shaft 52 where the second bearing 62 is placed. In this case, as shown by the alternate long dashed line and two short dashed lines M in FIG. 2, the detector can detect radial shifting of the first shaft 52 to another position from its normal position.

In another case, the arrow K shows the direction of a load applied to the part of the first shaft 52 where the first bearing 61 is placed. The arrow N shows the direction of a load applied to the part of the first shaft 52 where the second bearing 62 is placed. In this case, as shown by the short dashed line O in FIG. 2, the detector 20 can detect inclination of the first shaft 52 from its normal position.

Thus, the detector 20 can detect an inclination or runout of the centerline 521 of the first shaft 52, based on the outputs from the heat flux sensors for the first bearing and the heat flux sensors for the second bearing.

As described above, the monitoring device 1 of this embodiment provides functions and effects as follows.

(1) In this embodiment, the heat flux sensors 10 are provided on the radially outer side of the first bearing 61 and spaced from each other in the circumferential direction of the first bearing 61. Thus, the detector 20 removes temperature drifts from the outputs of the heat flux sensors 10, based on the outputs corresponding to the differences between the thermal electromotive forces of the heat flux sensors 10. This allows the detector 20 to extract output signals corresponding to the loads applied to the first shaft 52 or first bearing 61 in radial directions thereof. Accordingly, the monitoring device 1 of this embodiment can monitor a load applied to the first shaft 52 or first bearing 61 in a radial direction thereof while the first shaft 52 of the forming machine 50 is rotating.

(2) In this embodiment, the first heat flux sensor 11 and the second heat flux sensor 12 are placed symmetrical to each other with respect to the centerline 521 of the first shaft 52.

Accordingly, when a load is applied to the first shaft 52 at one end of the line L1 connecting the first heat flux sensor 11 and second heat flux sensor 12, the heat flux sensor at that end will have a larger thermal electromotive force. The heat flux sensor at the other end will have a smaller thermal electromotive force. Thus, the detector can detect a load applied to the first shaft 52 or first bearing 61 in a radial direction thereof, based on an output corresponding to the difference between the thermal electromotive force of the first heat flux sensor 11 and the thermal electromotive force of the second heat flux sensor 12.

(3) In this embodiment, the detector 20 detects the first signal V1, that is, a voltage signal corresponding to the difference between the thermal electromotive force of the first heat flux sensor 11 and the thermal electromotive force of the second heat flux sensor 12. The detector 20 also detects the second signal V2, that is, a voltage signal corresponding to the difference between the thermal electromotive force of the third heat flux sensor 13 and the thermal electromotive force of the fourth heat flux sensor 14. The detector 20 detects the direction or magnitude of the load applied to the first shaft 52 or first bearing 61, based on the first signal V1 and second signal V2.

Accordingly, the first signal V1 corresponds to the component B of the load A applied to the first shaft 52 in a radial direction thereof, the component B being parallel to the line L1 connecting the first heat flux sensor 11 and second heat flux sensor 12. Further, in this case, the second signal V2 corresponds to the component C of the load A applied to the first shaft 52 in a radial direction thereof, the component C being parallel to the line L2 connecting the third heat flux sensor 13 and fourth heat flux sensor 14. Thus, the detector 20 can detect the direction or magnitude of the load A applied to the first shaft 52 or first bearing 61 by combining the two components B and C detected based on the first signal V1 and second signal V2.

(4) In this embodiment, the detector 20 detects application of an abnormal load to the first shaft 52 when the absolute value of the magnitude of the load applied to the first shaft 52 exceeds the threshold H.

Accordingly, the detector 20 can accurately detect application of an abnormal load to the first shaft 52.

(5) In this embodiment, the heat flux sensors 10 are all arranged at positions not on a plane α which includes the centerline 521 of the first shaft 52 and the centerline 531 of the second shaft 53.

In a case where the processing target 56 is to be formed with the first forming roller 54 and second forming roller 55, the following can be considered. In particular, a large load will be applied to the first shaft 52 along the plane α including the centerline 521 of the first shaft 52 and the centerline 531 of the second shaft 53. Thus, in the forming machine 50, if a heat flux sensor 10 is placed on the plane α including the centerline 521 of the first shaft 52 and the centerline 531 of the second shaft 53, the heat flux sensor 10 may get damaged. Accordingly, with the heat flux sensors 10 placed at positions not on the plane α in the forming machine 50, the heat flux sensors 10 are prevented from being damaged.

(6) In this embodiment, the heat flux sensors for the second bearing are provided on the radially outer side of the second bearing 62 and spaced from each other in the circumferential direction of the second bearing 62.

Accordingly, the detector 20 can detect loads applied radially to the part of the first shaft 52 where the first bearing 61 is placed, based on the outputs from the heat flux sensors for the first bearing. The detector 20 can detect loads applied radially to the part of the first shaft 52 where the second bearing 62 is placed, based on the outputs from the heat flux sensors for the second bearing. Thus, the detector 20 can detect an inclination or runout of the centerline 521 of the first shaft 52, based on the load applied at the position of the first bearing 61 and the load applied at the position of the second bearing 62 among the loads applied to the first shaft 52 in radial directions thereof.

(7) In this embodiment, the thermal conductive sheets 15 are placed between the outer wall of the first bearing 61 and the heat flux sensors 10. Additionally, the thermal conductive sheets 16 are placed between the inner walls of the recesses 59 in the housing 51 and the heat flux sensors 10.

Accordingly, the thermal conductive sheets 15, 16 enable the outer wall of the first bearing 61, the heat flux sensors 10, and the inner walls of the recesses 59 to contact tightly with each other. As a result, heat flows well through them. Thus, in the monitoring device 1 of this embodiment, the heat flux sensors 10 can detect heat flux with greater accuracy.

Second Embodiment

The monitoring device 1 of a second embodiment differs from the first embodiment in the method of detecting an abnormality, performed by the detector 20.

Figure 8:
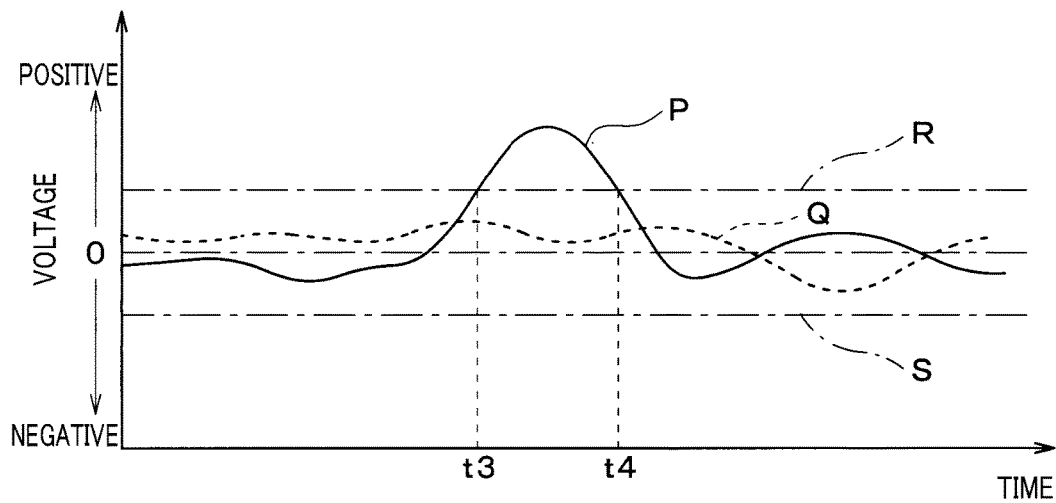
FIG. 8 shows an example of the change in the output voltage from the heat flux sensors over time according to a second embodiment.

FIG. 8 shows examples of the changes in the first signal V1 and second signal V2 over time when the forming machine 50 is in operation. The horizontal axis in FIG. 8 shows the time that has elapsed since the forming machine 50 started operation. The vertical axis shows voltage.

In FIG. 8, the solid line P shows the change in the first signal V1. The dashed line Q shows the change in the second signal V2. Here, it is assumed that the first signal V1 becomes a positive voltage signal when the load at one of the ends of the line L1 connecting the first heat flux sensor 11 and second heat flux sensor 12 increases. The first signal V1 becomes a negative voltage signal when the load at the other end of the line L1 connecting the first heat flux sensor 11 and second heat flux sensor 12 increases.

It is assumed that the second signal V2 becomes a positive voltage signal when the load at one of the ends of the line L2 connecting the third heat flux sensor 13 and fourth heat flux sensor 14 increases. The second signal V2 becomes a negative voltage signal when the load at the other end of the line L2 connecting the third heat flux sensor 13 and fourth heat flux sensor 14 increases.

As shown by the alternate long and short dashed line R, S in FIG. 8, the detector 20 stores the values of voltage signals that correspond to the tolerable loads of the first shaft 52 as certain thresholds R, S. The thresholds R, S are preset according to experiments or the like.

As shown by the solid line P in FIG. 8, the first signal V1 exceeds the threshold R between time t3 and time t4. In this case, the detector 20 detects application of abnormal loads to the first shaft 52 between time t3 and time t4.

In the second embodiment, the detector 20 detects application of an abnormal load to the shaft when one of the first signal V1 and second signal V2 exceeds the certain thresholds R, S.

Accordingly, the detector 20 can detect application of an abnormal load to the first shaft 52, based on the first signal V1 or second signal V2.

Third Embodiment

The monitoring device 1 of the third embodiment differs from the first embodiment in the way the first to fourth heat flux sensors 11 to 14 are attached to the bearing.

Figure 9:
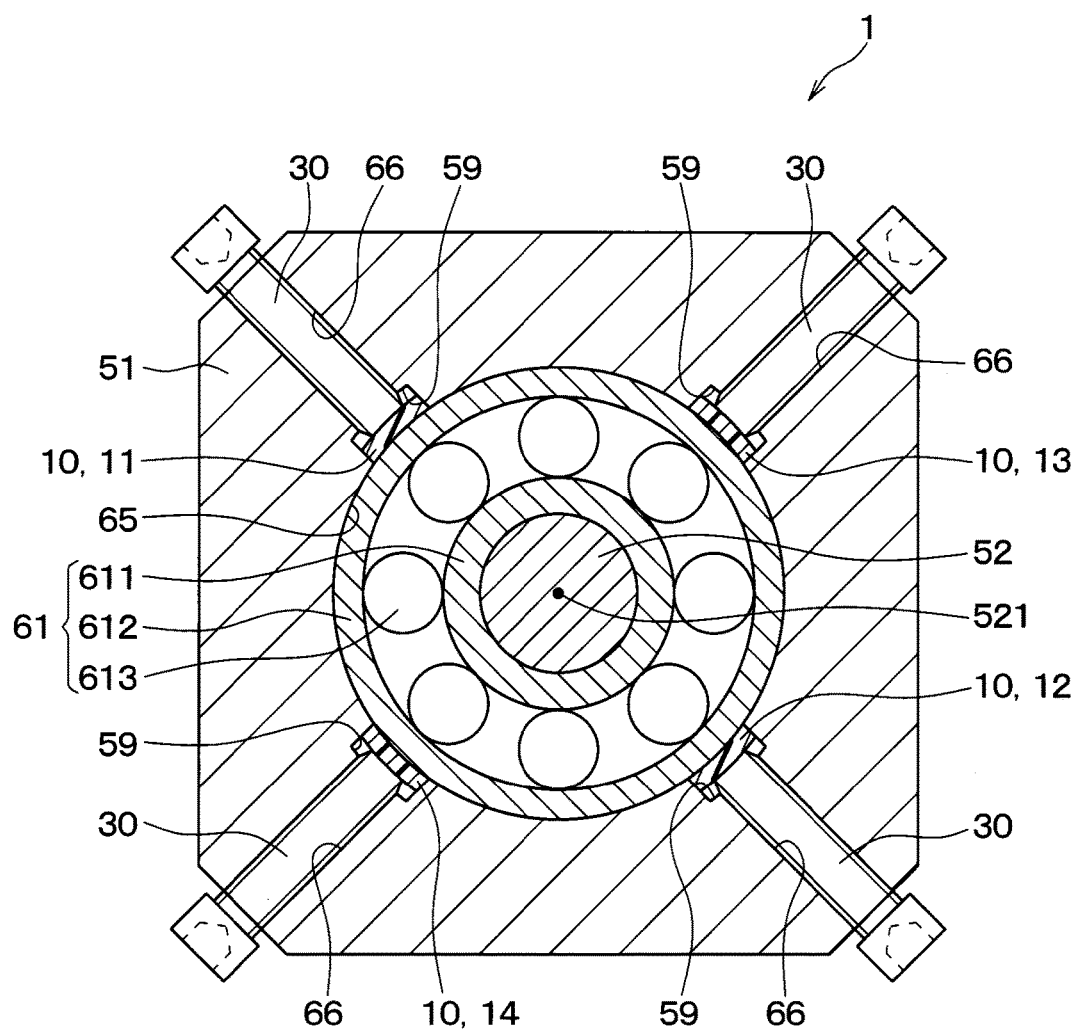
FIG. 9 is a partial cross-sectional view of the target device to which the monitoring device is attached according to a third embodiment.

As shown in FIG. 9, the housing 51 in the forming machine 50 includes threaded holes 66 extending outwards in radial directions of the first bearing 61 (radially outwards) from the inner walls of the recesses 59. Screw members 30 are inserted into the threaded holes 66. Each screw member 30 is engaged with the internal thread formed on the inner wall of the corresponding threaded hole 66. The leading ends of the screw members 30 on the bearing side are in contact with the first to fourth heat flux sensors 11 to 14. The screw members 30 press the heat flux sensors 10 against the outer wall of the first bearing 61. Accordingly, the third embodiment prevents gaps being formed between the outer wall of the first bearing 61 and the heat flux sensors 10.

The screw members 30 are formed of a material with a relatively high thermal conductivity such as aluminum. The housing 51 is made of a material with a thermal conductivity that is equal to or lower than that of the screw members 30 such as stainless steel, iron, and aluminum.

In the third embodiment, heat flows well through the heat flux sensors 10 and the screw members 30 because the heat flux sensors 10 and the screw members 30 are in contact with each other. Thus, in the monitoring device 1 of the third embodiment, the heat flux sensors 10 can detect heat flux with greater accuracy.

Additionally, in the third embodiment, by increasing the thermal conductivity of the screw members 30, heat flows well through the heat flux sensors 10 and the screw members 30 even when the housing 51 is made of a material with a low thermal conductivity. Thus, in the monitoring device 1 of the third embodiment, the heat flux sensors 10 can detect heat flux with greater accuracy.

Fourth Embodiment

The monitoring device 1 of the fourth embodiment differs from the first embodiment in the way the first to fourth heat flux sensors 11 to 14 are attached to the bearing.

Figure 10:
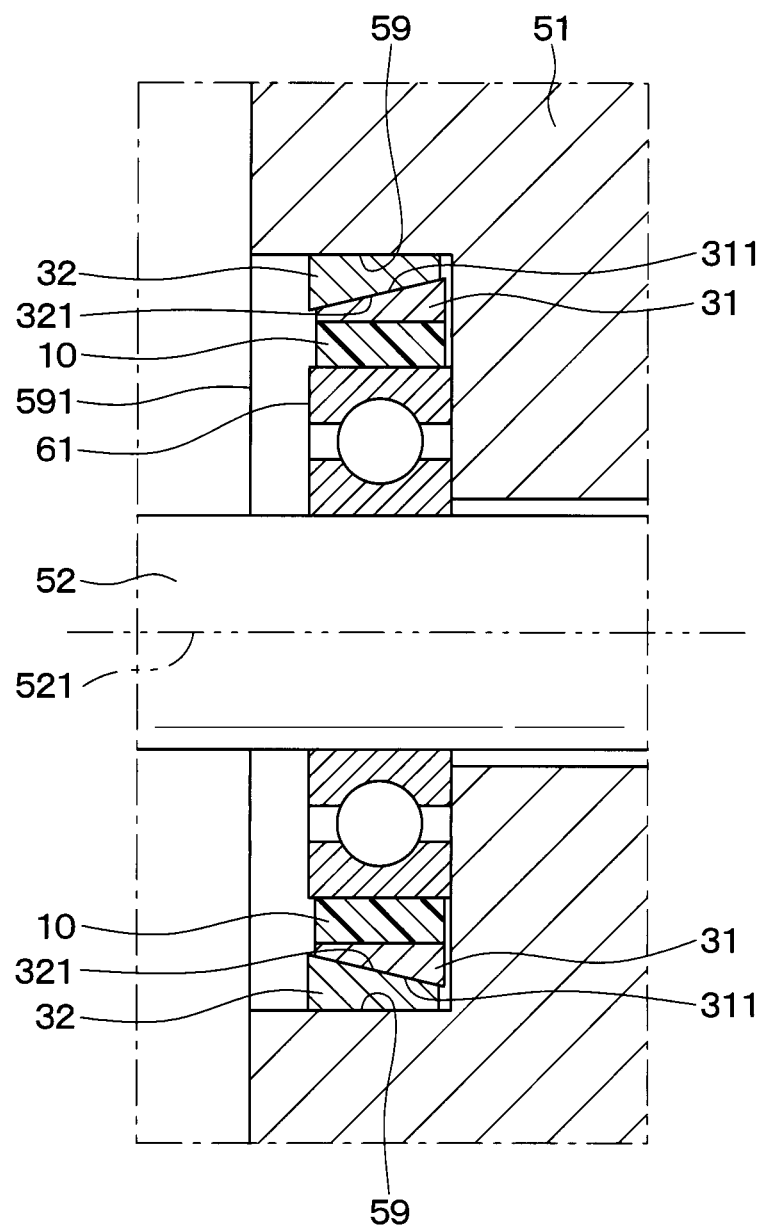
FIG. 10 is a partial cross-sectional view of the target device to which the monitoring device is attached according to a fourth embodiment.

As shown in FIG. 10, a heat flux sensor 10, a first wedge member 31, and a second wedge member 32 are placed between the first bearing 61 and the inner wall of each recess 59 of the housing 51 in that order from the first bearing 61 side. The first wedge member 31 has a first inclined face 311 on the second wedge member 32 side. The first inclined face 311 is inclined such that the distance from the heat flux sensor 10 becomes larger from an opening 591 side in the axial direction of the first shaft 52 towards the opposite side in the recess 59 of the housing 51.

The second wedge member 32 has a second inclined face 321 on the first wedge member 31 side. The second inclined face 321 is inclined such that the distance from the heat flux sensor 10 becomes larger from the opening 591 side in the axial direction of the first shaft 52 towards the opposite side in the recess 59 of the housing 51. The first inclined face 311 and second inclined face 321 have the same angle of inclination. In the fourth embodiment, after the first wedge member 31 has been placed on the heat flux sensor 10, the second wedge member 32 is inserted from the opening 591 in the axial direction of the first shaft 52 towards the opposite side in the recesses 59 of the housing 51. Thus, in the fourth embodiment, the outer wall of the first bearing 61, the heat flux sensor 10, the first wedge member 31, the second wedge member 32, and the inner wall of the recess 59 contact tightly with each other. As a result, heat flows well through these members. Thus, in the monitoring device 1 of the fourth embodiment, the heat flux sensors 10 can detect heat flux with greater accuracy.

Fifth Embodiment

The fifth embodiment is a variation of the fourth embodiment.

Figure 11:
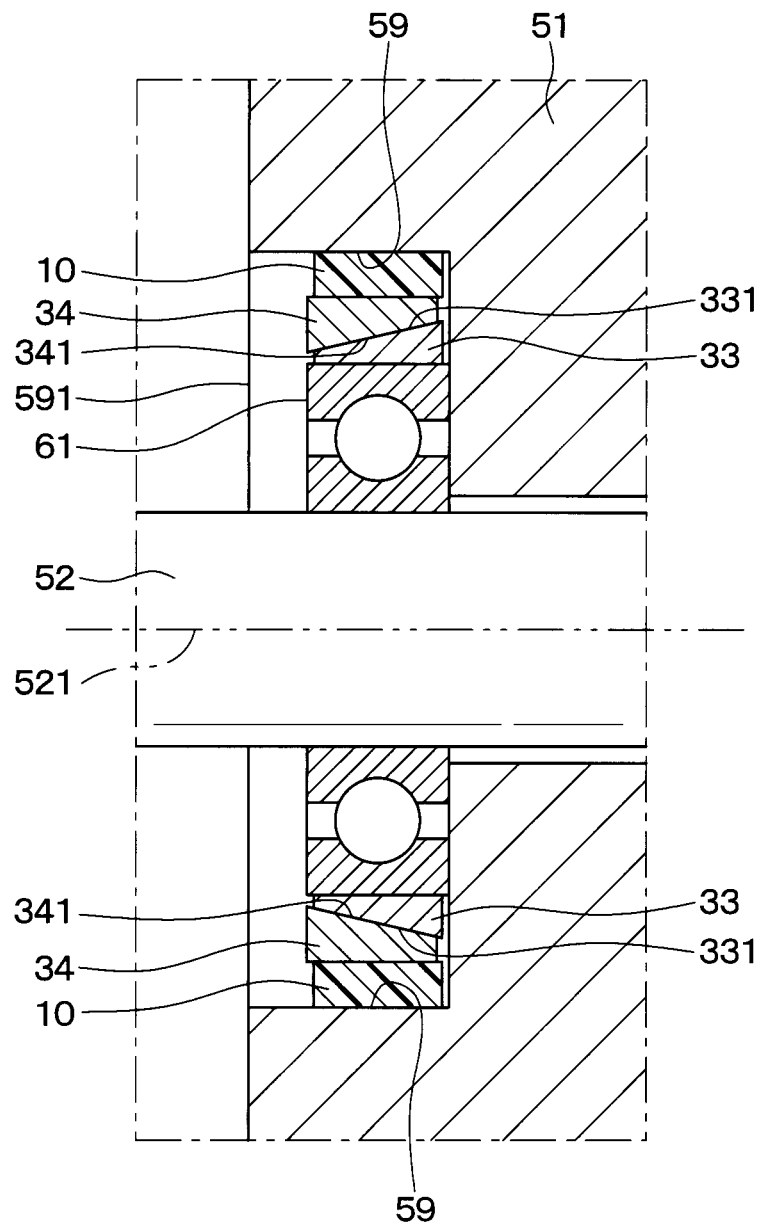
FIG. 11 is a partial cross-sectional view of the target device to which the monitoring device is attached according to a fifth embodiment.

As shown in FIG. 11, in the fifth embodiment, a third wedge member 33, a fourth wedge member 34, and a heat flux sensor 10 are placed between the first bearing 61 and the inner wall of the recess 59 of the housing 51 in that order from the first bearing 61 side. The third wedge member 33 has a third inclined face 331 on the fourth wedge member 34 side. The third inclined face 331 is inclined such that the distance from the first bearing 61 becomes larger from the opening 591 side in the axial direction of the first shaft 52 towards the opposite side in the recess 59 of the housing 51.

The fourth wedge member 34 has a fourth inclined face 341 on the third wedge member 33 side. The fourth inclined face 341 is inclined such that the distance from the first bearing 61 becomes larger from the opening 591 side in the axial direction of the first shaft 52 towards the opposite side in the recess 59 of the housing 51. The third inclined face 331 and fourth inclined face 341 have the same angle of inclination. In the fifth embodiment, after the third wedge member 33 has been placed on the heat flux sensor 10, the fourth wedge member 34 is inserted from the opening 591 in the axial direction of the first shaft 52 towards the opposite side in the recesses 59 of the housing 51. Thus, in the fifth embodiment, the outer wall of the first bearing 61, the third wedge member 33, the fourth wedge member 34, the heat flux sensor 10, and the inner wall of the recess 59 contact tightly with each other. As a result, heat flows well through these members. Thus, in the monitoring device 1 of the fifth embodiment, the heat flux sensors 10 can detect heat flux with greater accuracy.

The monitoring device 1 may also be implemented by combining the fourth embodiment and the fifth embodiment. In particular, the monitoring device 1 may include the third wedge member 33, the fourth wedge member 34, the heat flux sensor 10, the first wedge member 31, and the second wedge member 32 placed between the first bearing 61 and the inner wall of the recess 59 of the housing 51 in that order from the first bearing 61 side.

Sixth Embodiment

Figure 12:
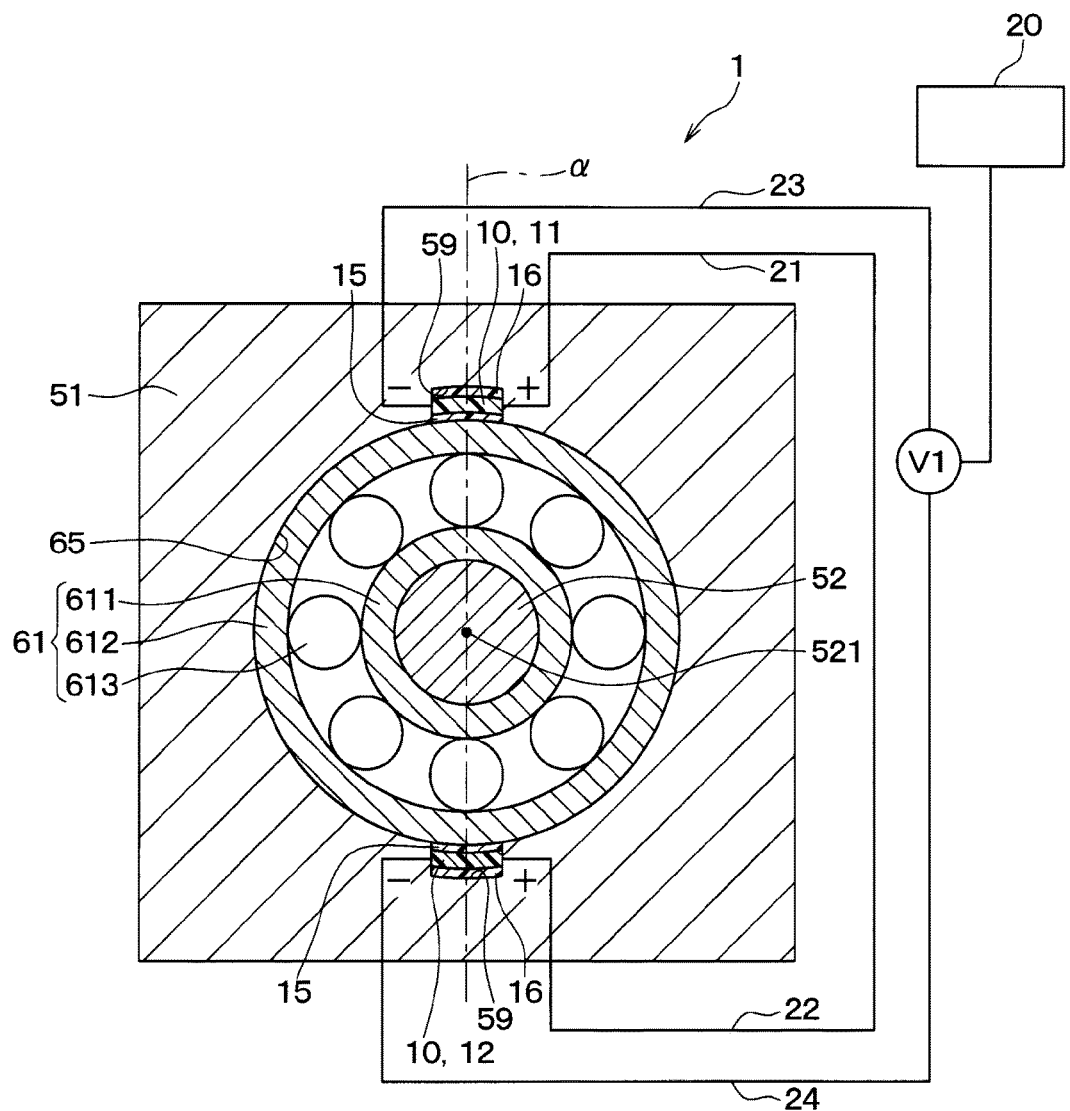
FIG. 12 is a partial cross-sectional view of the target device to which the monitoring device is attached according to a sixth embodiment.

As shown in FIG. 12, the monitoring device 1 of the sixth embodiment includes only the first heat flux sensor 11 and the second heat flux sensor 12 on the radially outer side of the first bearing 61 and does not include the third and fourth heat flux sensors.

The first heat flux sensor 11 and second heat flux sensor 12 are provided on the radially outer side of the first bearing 61 and spaced from each other in the circumferential direction of the first bearing 61. The first heat flux sensor 11 and the second heat flux sensor 12 are positioned symmetrical to each other with respect to the centerline 521 of the first shaft 52.

The first and second heat flux sensors 11, 12 are positioned on the plane α including the centerline 521 of the first shaft 52 and the centerline 531 of the second shaft 53.

The signals outputted from the first heat flux sensor 11 and second heat flux sensor 12 are inputted into the detector 20. The detector 20 detects the first signal V1, that is, a voltage signal corresponding to the difference between the thermal electromotive force of the first heat flux sensor 11 and the thermal electromotive force of the second heat flux sensor 12. The detector 20 detects a load applied to the first shaft 52 in a radial direction thereof, based on the first signal V1.

In the forming machine 50, large loads are applied to the first shaft 52 and second shaft 53 in directions along the plane α including the centerline 521 of the first shaft 52 and the centerline 531 of the second shaft 53. In the sixth embodiment, the first heat flux sensor 11 and second heat flux sensor 12 are positioned on the plane α. Accordingly, the detector 20 can detect a large load applied to the first shaft 52.

Additionally, when the first signal V1 is compared to a threshold and the first signal V1 exceeds the threshold, the detector 20 can detect application of an abnormal load to the first shaft 52.

Seventh Embodiment

Figure 13:
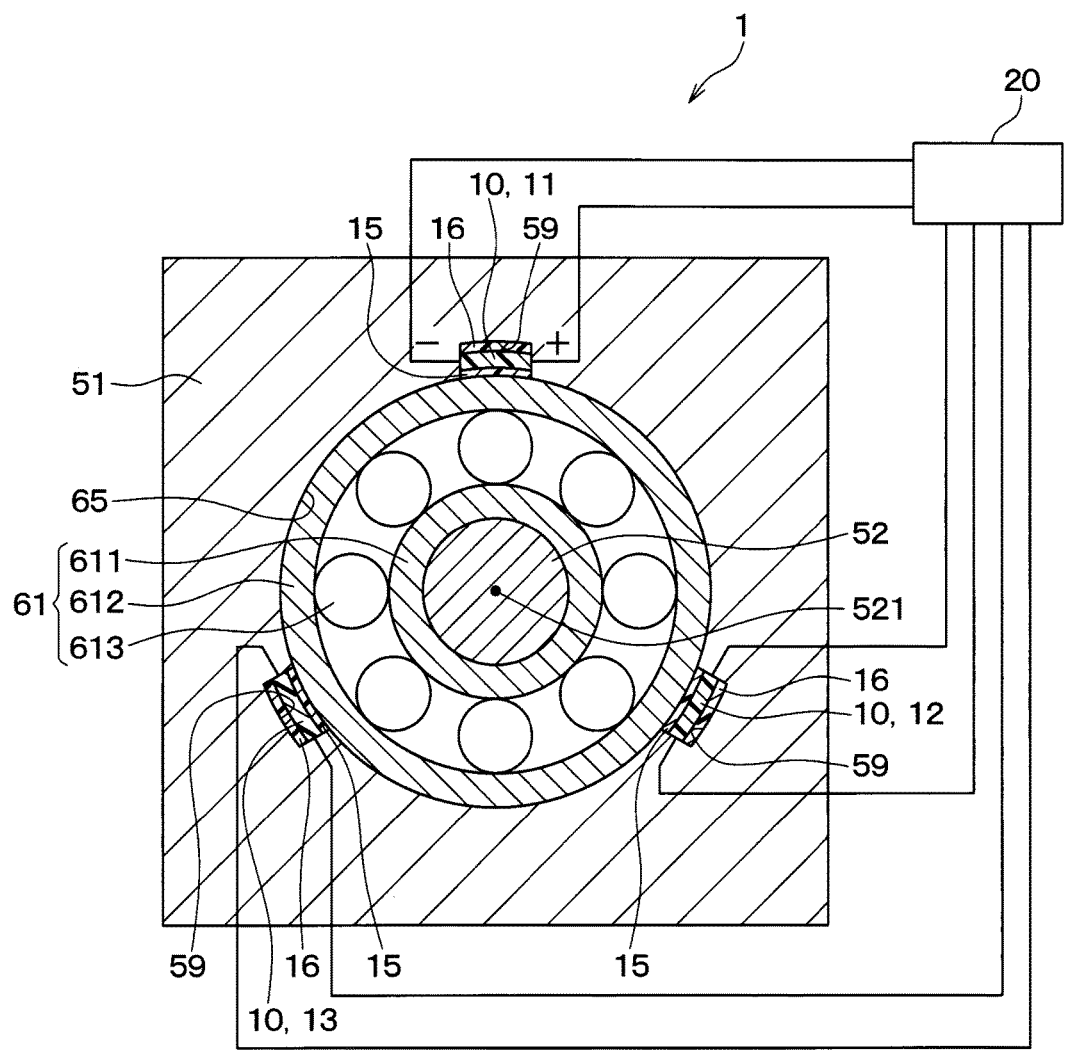
FIG. 13 is a partial cross-sectional view of the target device to which the monitoring device is attached according to a seventh embodiment.

As shown in FIG. 13, the monitoring device 1 of the seventh embodiment includes the first heat flux sensor 11, second heat flux sensor 12, and third heat flux sensor 13 on the radially outer side of the first bearing 61.

The first to third heat flux sensors 11 to 13 are provided on the radially outer side of the first bearing 61 and spaced from each other in the circumferential direction of the first bearing 61.

The signals outputted from the first to third heat flux sensors 11 to 13 are inputted into the detector 20. The detector 20 removes temperature drifts from the outputs of the first to third heat flux sensors 11 to 13, based on the differences of the outputs of those heat flux sensors 11 to 13. This allows the detector 20 to extract an output signal corresponding to the load applied to the first shaft 52 or first bearing 61 in a radial direction thereof. Accordingly, the monitoring device 1 of the seventh embodiment can monitor loads applied to the first shaft 52 or first bearing 61 in radial directions thereof while the first shaft 52 is rotating.

Additionally, when the load applied to the first shaft 52 or first bearing 61 is compared to a certain threshold and the load exceeds the threshold, the detector 20 can detect application of an abnormal load to the first shaft 52.

OTHER EMBODIMENTS

Implementations of the technique disclosed herein are not limited to the above embodiments. Implementations of the technique disclosed herein may be altered as appropriate as follows.

(1) Although the forming machine 50 is described as the device to be monitored for abnormality diagnosis in the above described embodiments, the device to be monitored may be various devices including a shaft and a bearing.

(2) Although the bearing was one that includes spherical rolling elements 613 (a ball bearing) in the above described embodiments, the bearing may be, for example, a roller bearing with cylindrical rolling elements 613, or a plain bearing, a magnetic bearing, or a fluid bearing which do not include rolling elements 613.

(3) Although a plurality of heat flux sensors for the first bearing and a plurality of heat flux sensors for the second bearing are attached, respectively, to the first bearing 61 of the first shaft 52 and the second bearing 62 of the first shaft 52 in the above described embodiments, a plurality of heat flux sensors may be also attached to each of the third bearing 63 and fourth bearing 64 of the second shaft 53.

Additionally, heat flux sensors for the first bearing may be provided only on the first bearing 61 of the first shaft 52 and no heat flux sensors for the second bearing may be provided on the second bearing 62 of the first shaft 52.

(4) Although heat flux sensors configured as shown in FIGS. 4 and 5 are used in the above described embodiments, heat flux sensors with another configuration may be used.

(5) Although two to four heat flux sensors are provided on each bearing in the above described embodiments, five or more heat flux sensors may be provided on each bearing.

(6) Elements of the above described embodiments may be combined as appropriate unless it is obvious that the elements cannot be combined. Further, elements of the above described embodiments are not necessarily essential unless otherwise specified or, theoretically, the element is obviously considered to be essential.

CONCLUSION

According to a first aspect presented by a part or the whole of the above described embodiments, a plurality of heat flux sensors, included in a monitoring device, are provided on the radially outer side of a bearing and spaced from each other in the circumferential direction of the bearing, and the heat flux sensors output signals corresponding to heat fluxes through their faces on the bearing side and their faces on the other side. The detector detects loads applied radially to the shaft or bearing, based on the outputs from the heat flux sensors.

According to a second aspect, the heat flux sensors include a first heat flux sensor and a second heat flux sensor. The first heat flux sensor and the second heat flux sensor are positioned symmetrical to each other with respect to the centerline of the shaft. Thus, the detector detects the load applied to the shaft in a radial direction thereof, based on an output corresponding to the difference between the thermal electromotive force of the first heat flux sensor and the thermal electromotive force of the second heat flux sensor.

Accordingly, when a load is applied to the shaft at one end of the line connecting the first heat flux sensor and the second heat flux sensor, the thermal electromotive force of the heat flux sensor at that end increases. The thermal electromotive force of the heat flux sensor at the other end decreases. Thus, the detector can detect the load applied to the shaft or bearing in a radial direction thereof, based on an output corresponding to the difference between the thermal electromotive force of the first heat flux sensor and the thermal electromotive force of the second heat flux sensor.

According to a third aspect, the detector detects application of an abnormal load to the shaft when an output corresponding to the difference between the thermal electromotive force of the first heat flux sensor and the thermal electromotive force of the second heat flux sensor exceeds a certain threshold.

Thus, when the load applied radially to the shaft or bearing exceeds a load corresponding to the threshold, the detector can detect application of an abnormal load to the shaft.

According to a fourth aspect, the heat flux sensors further include a third heat flux sensor and a fourth heat flux sensor.

The third heat flux sensor is placed on the radially outer side of the bearing in a direction that intersects with the line connecting the first heat flux sensor and the second heat flux sensor. The third heat flux sensor and the fourth heat flux sensor are positioned on the radially outer side of the bearing so as to be symmetrical to each other with respect to the centerline of the shaft.

Thus, the detector can detect the load applied to the shaft or bearing in a radial direction thereof, based on an output corresponding to the difference between the thermal electromotive force of the third heat flux sensor and the thermal electromotive force of the fourth heat flux sensor, in addition to the output corresponding to the difference between the thermal electromotive force of the first heat flux sensor and the thermal electromotive force of the second heat flux sensor.

According to a fifth aspect, the detector detects the direction or magnitude of the load applied to the shaft or bearing, based on a first signal and a second signal. The first signal is a voltage signal corresponding to the difference between the thermal electromotive force of the first heat flux sensor and the thermal electromotive force of the second heat flux sensor. The second signal is a voltage signal corresponding to the difference between the thermal electromotive force of the third heat flux sensor and the thermal electromotive force of the fourth heat flux sensor.

Accordingly, when a load is applied to the shaft in a radial direction thereof, the first signal corresponds to a component of the load that is parallel to the line connecting the first heat flux sensor and the second heat flux sensor. Further, in this case, the second signal corresponds to a component of the load that is parallel to the line connecting the third heat flux sensor and the fourth heat flux sensor. Thus, the detector can detect the direction or magnitude of the load applied to the shaft or bearing by combining the two components detected based on the first and second signals.

According to a sixth aspect, the detector detects application of an abnormal load to the shaft when the absolute value of the magnitude of the load applied to the shaft or bearing exceeds a certain threshold.

Thus, the detector can accurately detect application of an abnormal load to the shaft.

According to a seventh aspect, the bearing is a first bearing and the heat flux sensors are heat flux sensors for the first bearing. Additionally, the target device further includes a second bearing placed apart from the first bearing in the axial direction of the shaft.

The monitoring devices are provided on the radially outer side of the second bearing and spaced from each other in the circumferential direction thereof. The monitoring device further includes heat flux sensors for the second bearing which output signals corresponding to heat fluxes through their faces on the second bearing side and their faces on the other side.

The detector can detect an inclination or runout of the shaft, based on the outputs from the heat flux sensors for the first bearing and the heat flux sensors for the second bearing.

Accordingly, the detector detects loads applied to the shaft in radial directions thereof at the position of the first bearing, based on the outputs from the heat flux sensors for the first bearing. The detector detects loads applied to the shaft in radial directions thereof at the position of the second bearing, based on the outputs from the heat flux sensors for the second bearing. Thus, the detector can detect an inclination or runout of the centerline of the shaft, based on the load applied to the shaft at the position of the first bearing and the load applied to the shaft at the position of the second bearing among the loads applied to the shaft in radial directions thereof.

According to an eighth aspect, the housing in the target device includes recesses at positions where the heat flux sensors are attached to the bearing. The recesses accommodate the heat flux sensors.

The monitoring device further includes a thermal conductive member between the outer wall of the bearing and the heat flux sensor or between the inner wall of the recess and the heat flux sensor.

Accordingly, the thermal conductive members allow the outer wall of the bearing, the heat flux sensors, and the inner walls of the recesses to contact tightly with each other. As a result, heat flows well through them. Thus, the heat flux sensors in the monitoring device can detect heat flux more accurately.

According to a ninth aspect, the housing in the target device includes recesses at positions where the heat flux sensors are attached to the bearing. The recesses accommodate the heat flux sensors.

The monitoring device further includes wedge members between the outer wall of the bearing and the heat flux sensor or between the inner wall of the recess and the heat flux sensor.

Accordingly, the wedge members allow the outer wall of the bearing, the heat flux sensors, and the inner walls of the recesses to contact tightly with each other. As a result, heat flows well through them. Thus, the heat flux sensors in the monitoring device can detect heat flux more accurately.

According to a tenth aspect, the housing in the target device includes recesses which accommodate the heat flux sensors and threaded holes extending from the inner walls of the recesses towards the radially outer side of the bearing at positions where the heat flux sensors are attached to the bearing.

The monitoring device further includes screw members inserted into the threaded holes to contact with the heat flux sensors.

Accordingly, the screw members press the heat flux sensors against the outer wall of the bearing and prevent gaps being formed between the outer wall of the bearing and the heat flux sensors. Additionally, in the monitoring device, heat flows well through the heat flux sensors and the screw members because the heat flux sensors and the screw members are in contact with each other. Thus, the heat flux sensors in the monitoring device can detect heat flux more accurately.

According to an eleventh aspect, the thermal conductivity of the screw members is equal to or higher than that of the housing.

Thus, in the monitoring device, by providing the screw members with a high thermal conductivity, heat flows well through the heat flux sensors and the screw members even when the housing is made of a material with a low thermal conductivity. Accordingly, in the monitoring device, the heat flux sensors can detect heat flux with greater accuracy.

What is claimed is:

1. A monitoring device monitoring a target device comprising a housing, a bearing attached to the housing, and a shaft placed radially inside the bearing such that the shaft can rotate with respect to the housing, the monitoring device comprising:
   a plurality of heat flux sensors provided on the radially outer side of the bearing and spaced from each other in a circumferential direction of the bearing, the heat flux sensors outputting a signal corresponding to heat fluxes between faces thereof on the bearing side and faces thereof on the other side; and a detector configured to detect a load applied to the shaft or the bearing in a radial direction thereof, based on an output from the heat flux sensors.

2. The monitoring device according to claim 1, wherein the bearing is a first bearing and the heat flux sensors are heat flux sensors for the first bearing, the target device further includes a second bearing placed apart from the first bearing in an axial direction of the shaft, the monitoring device further comprises a plurality of heat flux sensors for the second bearing, the heat flux sensors being provided on a radially outer side of the second bearing and spaced from each other in a circumferential direction of the second bearing, the heat flux sensors for the second bearing outputting a signal corresponding to heat fluxes through faces thereof on the second bearing side and faces thereof on the other side, and the detector detects an inclination or runout of the shaft, based on outputs from the heat flux sensors for the first bearing and the heat flux sensors for the second bearing.

3. The monitoring device according to claim 1, wherein the housing in the target device includes recesses which accommodate the heat flux sensors at positions where the heat flux sensors are attached to the bearing, and the monitoring device further comprises a thermal conductive member between an outer wall of the bearing and the heat flux sensors or between inner walls of the recesses and the heat flux sensors.

4. The monitoring device according to claim 1, wherein the housing in the target device includes recesses which accommodate the heat flux sensors at positions where the heat flux sensors are attached to the bearing, the monitoring device further comprises wedge members between an outer wall of the bearing and the heat flux sensors or between inner walls of the recesses and the heat flux sensors, and the wedge members allow the outer wall of the bearing and the heat flux sensors or the inner walls of the recesses and the heat flux sensors to contact tightly with each other.

5. The monitoring device according to claim 1, wherein the housing in the target device includes recesses which accommodate the heat flux sensors and threaded holes extending outwards in radial directions of the bearing from inner walls of the recesses at positions where the heat flux sensors are attached to the bearing, and the monitoring device further comprises screw members which are inserted into the threaded holes to contact with the heat flux sensors.

6. The monitoring device according to claim 5, wherein a thermal conductivity of the screw members is equal to or higher than that of the housing.

7. The monitoring device according to claim 1, wherein the heat flux sensors include a first heat flux sensor and a second heat flux sensor, the first heat flux sensor and the second heat flux sensor are positioned symmetrical to each other with respect to a centerline of the shaft, and the detector detects the load applied to the shaft in the radial direction thereof, based on an output corresponding to a difference between a thermal electromotive force of the first heat flux sensor and a thermal electromotive force of the second heat flux sensor.

8. The monitoring device according to claim 7, wherein the detector detects application of an abnormal load to the shaft when the output corresponding to the difference between the thermal electromotive force of the first heat flux sensor and the thermal electromotive force of the second heat flux sensor exceeds a certain threshold.

9. The monitoring device according to claim 7, wherein the heat flux sensors further include a third heat flux sensor placed on the radially outer side of the bearing in a direction intersecting with a line connecting the first heat flux sensor and the second heat flux sensor, and a fourth heat flux sensor placed on the radially outer side of the bearing so as to be symmetrical to the third heat flux sensor with respect to the centerline of the shaft.

10. The monitoring device according to claim 9, wherein the detector detects a direction or a magnitude of the load applied to the shaft or the bearing, based on a first signal which is a voltage signal corresponding to the difference between the thermal electromotive force of the first heat flux sensor and the thermal electromotive force of the second heat flux sensor, and a second signal which is a voltage signal corresponding to the difference between a thermal electromotive force of the third heat flux sensor and a thermal electromotive force of the fourth heat flux sensor.

11. The monitoring device according to claim 10, wherein the detector detects application of an abnormal load to the shaft when an absolute value of the magnitude of the load applied to the shaft or bearing exceeds a certain threshold.

* * * * *